United States Patent [19]

Lee

[11] Patent Number: 5,406,537
[45] Date of Patent: Apr. 11, 1995

[54] SYSTEM FOR REPRODUCING AN OPTICAL DISC

[75] Inventor: Cheon-sung Lee, Suwon, Rep. of Korea

[73] Assignee: Samsung Electronics Co., Ltd., Kyungki, Rep. of Korea

[21] Appl. No.: 35,153

[22] Filed: Mar. 22, 1993

[30] Foreign Application Priority Data

Jul. 14, 1992 [KR] Rep. of Korea ............... 92-12523

[51] Int. Cl.⁶ ........................................... C11B 7/00
[52] U.S. Cl. ................................. 369/47; 369/44.32; 369/32; 369/48
[58] Field of Search .............. 369/48, 54, 47, 44.26, 369/44.32, 44.27, 44.28, 44.29, 32, 50

[56] References Cited

U.S. PATENT DOCUMENTS

| | | | |
|---|---|---|---|
| 4,796,247 | 1/1989 | Vogelsang | 369/44.28 |
| 4,805,163 | 2/1989 | Ohnuki | 369/44.32 |
| 5,099,464 | 3/1992 | Maeda | 369/54 |
| 5,108,124 | 5/1991 | Ogasawara et al. | 369/44.32 |
| 5,109,365 | 4/1992 | Watanabe et al. | 369/32 |
| 5,122,999 | 6/1992 | Kimura et al. | 369/214.11 |
| 5,124,966 | 6/1992 | Roth et al. | 369/47 |
| 5,195,076 | 3/1993 | Aoki | 369/44.32 |
| 5,218,589 | 6/1993 | Aoki | 369/44.32 |
| 5,241,521 | 8/1993 | Shigemori | 369/54 |
| 5,313,443 | 5/1994 | Iitsuka | 369/50 |

FOREIGN PATENT DOCUMENTS 1-144281  6/1989  Japan .

Primary Examiner—Georgia Y. Epps
Assistant Examiner—Nabil Hinchi
Attorney, Agent, or Firm—Sughrue, Mion, Zinn, Macpeak & Seas

[57] ABSTRACT

A system for reproducing an optical disk which can prevent the restraint of an optical pickup in a track due to a scratch or other imperfection on the optical disk. The system includes checking whether or not there has been an increase of time in accordance with time information of a Q-channel in the demodulated subcode at the current pickup position, and, when the time is not increased, muting a reproduction output and jumping the optical pickup as far as a predetermined track. Thus, regardless of the occurrence of the optical pickup restraint phenomenon, reproduction can be continued by track jumping.

14 Claims, 4 Drawing Sheets

SYSTEM FOR REPRODUCING AN OPTICAL DISC

BACKGROUND OF THE INVENTION

The present invention relates to a system for reproducing an optical disk, and more particularly to a system for reproducing an optical disk which is capable of preventing the problem of an optical pickup staying in a same track due to a scratch or other imperfection on the optical disk.

Optical disk reproducers which use an optical disk as a recording medium include compact disk players, laser disk players, video disk players, compact disk graphics, etc. Such an optical disk reproducer reproduces an audio signal recorded on an optical disk by precise tracking and focusing.

Even though there may be no tracking and focusing errors, reproduction can be disrupted when physical errors occur, such as a scratched disk. That is, due to a scratch on the disk, one track is repeatedly reproduced (i.e., the pickup does not leave the track being reproduced). This phenomenon restrains an optical pickup in a track, which stops the reproduction from proceeding and a user must manually skip a currently reproduced program to the following program in order to continue the reproduction.

SUMMARY OF THE INVENTION

The present invention was developed to solve the above-described problem.

It is an object of the present invention to provide a reproduction system for an optical disk which is capable of preventing the restraint of an optical pickup in a track due to a scratch or other imperfection on an optical disk.

To achieve the object of the present invention, there is provided a system for reproducing an optical disk for controlling the track jumping of an optical pickup in accordance with a subcode written on an optical disk, comprising:

checking whether there has been an increase of time in accordance with time information of a Q-channel in the demodulated subcode at the current pickup position; and muting a reproduction output and jumping the optical pickup as far as a predetermined track, when it is determined that the time has not increased.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENT

Figure 1:
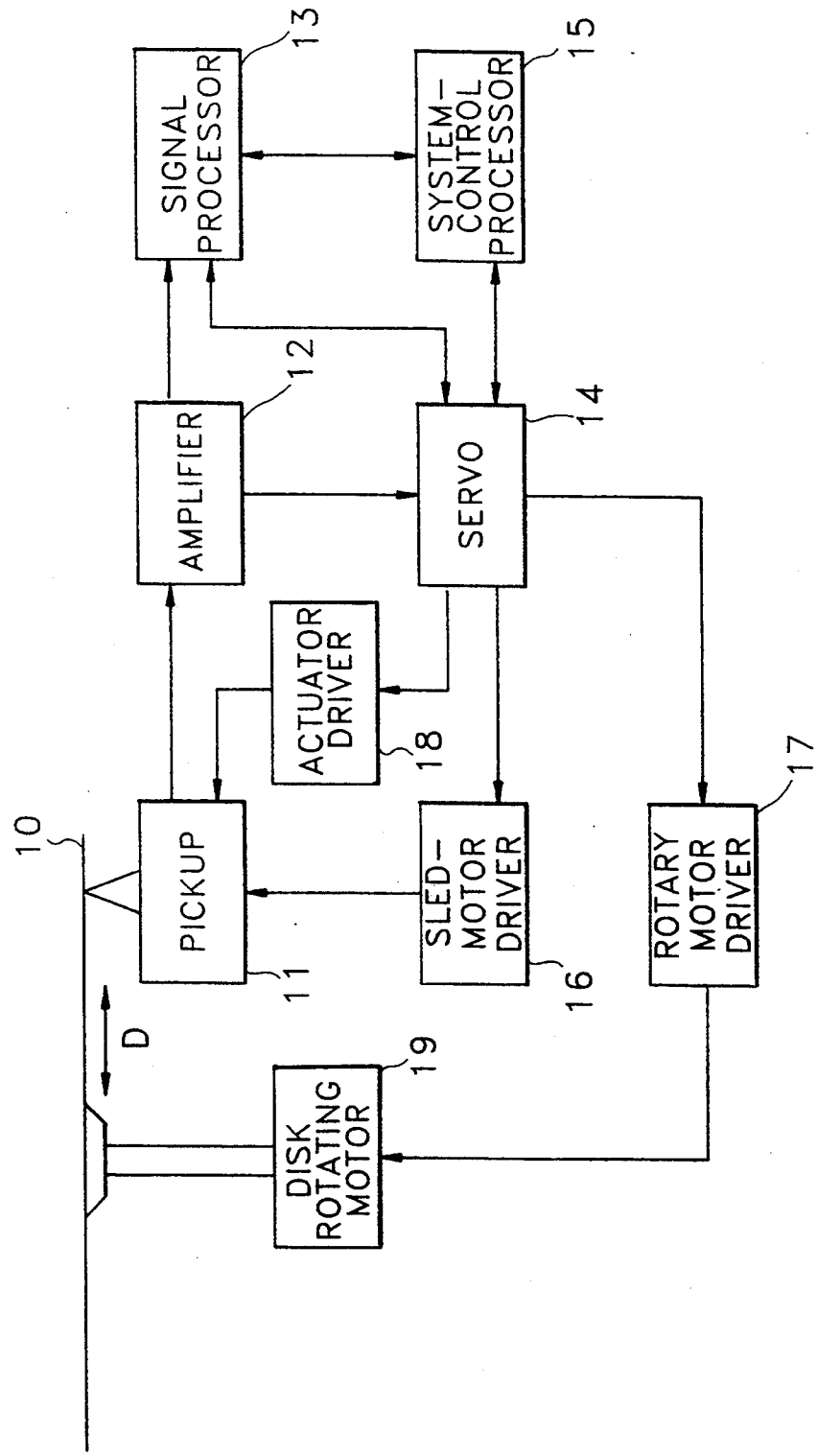
FIG. 1 is a block diagram showing a reproducer for performing a reproduction operation according to the present invention.

A disk reproducer for executing the method of the present invention will be described with reference to FIG. 1.

A pickup 11 picks up and outputs information recorded on a disk 10. Then, a radio frequency (RF) amplifier 12 amplifies the output from pickup 11 and outputs the amplified signal. The signal from RF amplifier 12 is input to a signal processor 13, so that sync signal detection, eight-to-fourteen modulation (EFM) processing, and subcode detection are carried out.

A servo 14 receives the signal from RF amplifier 12 and an EFM waveform shaping signal from signal processor 13, thereby outputting tracking, focusing and sled servo signals and a disk motor driving-control signal.

An actuator driver 18 receives the tracking/focusing servo signal of servo 14 to thereby drive a tracking-/focusing actuator (not shown) of pickup 11. At this time, the tracking actuator forces the pickup to jump inwardly or outwardly from the current track in accordance with the tracking servo signal.

A rotary motor driver 17 drives a disk rotating motor 19 in accordance with a disk motor driving-servo signal of servo 14, and the disk rotating motor 19 rotates disk 10.

A sled motor driver 16 receives a sled servo signal from servo 14 and drives a sled motor (not shown) of pickup 11, thereby transferring pickup 11 in the directions denoted by an arrow D shown in FIG. 1. More specifically, when accessing a user-selected program, the sled motor of pickup 11 is driven to thus transfer pickup 11 to the starting point of the desired program. While the tracking actuator transfers pickup 11 along a track within a limited range during reproduction, the sled motor moves pickup 11 according to the user's selection.

A system processor 15 controls the overall system, and controls servo 14 and signal processor 13 in accordance with the signal input from signal processor 13 and program selection information input by the user, during program selection and reproduction.

Figure 2A:
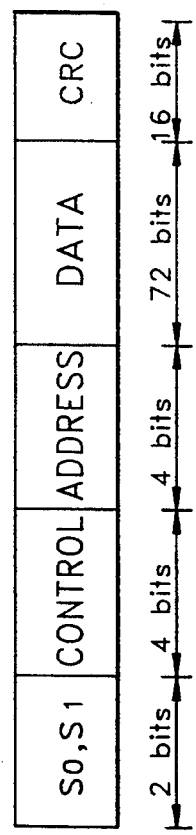
FIGS. 2A, 2B and 2C show the format of a subcode.
Figure 2B:
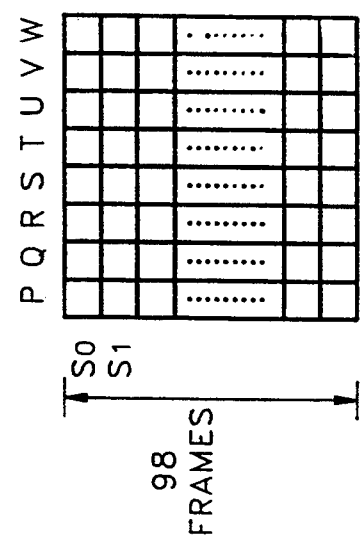
Figure 2C:
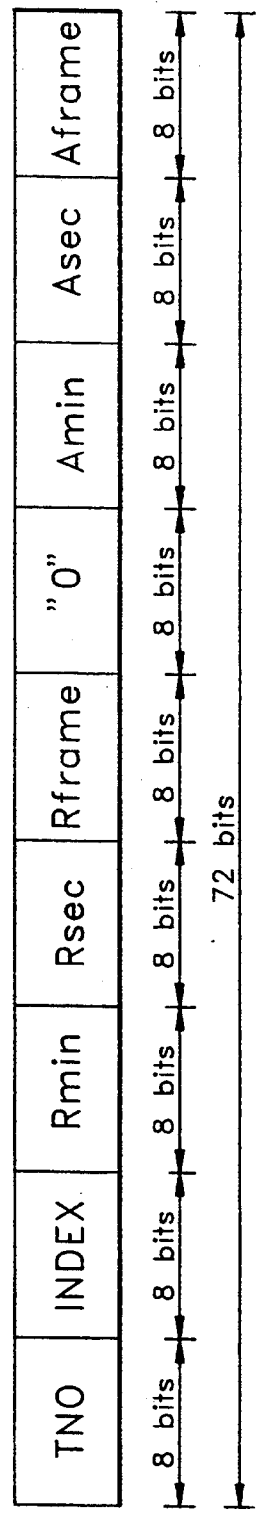

FIGS. 2A through 2C show the format of a subcode. The subcode is a kind of signal format recorded on the disk, which is used for reproduction programming functions according to the beginning of a program or a set of programs to be sequentially reproduced, and the recording of graphic display information and the like.

In FIG. 2A, one subcode block consists of 98 frames. Here, one frame is eight bits by stringing one-bit channels P, Q, R, S, T, U, V and W which are recorded on disk 10. Channels P and Q are utilized for representing the beginning or current position of the program. The other channels, R through W, are for recording graphic display information.

FIG. 2B shows a signal format with respect to channel Q in the subcode shown in FIG. 2A. Here, reference symbols $S_0$ and $S_1$ are sync signals for identifying the initial part of the block. The control block represents the channel number of an audio signal and existence of emphasis, thereby serving as a control signal in an audio circuit operation. Although the address can be coded into a mode 1 (0001), a mode 2 (0010) and a mode 3 (0011), it generally uses the mode 1. The content of data is shown in FIG. 2C. The cyclic redundancy code (CRC) is an error detection code, which is employed for reading out correct data by distinguishing it from incorrect data.

FIG. 2C illustrates a state that the address in the channel Q shown in FIG. 2B is coded into the mode 1. Here, a reference symbol TNO (track number) which shows a program number represents the programming sequence. An index is used for further partitioning of the programs marked by the TNO. Eight-bit Rmin, Rsec and Rframe represent minutes, seconds and frame sequence, respectively, and 75 frames correspond to one second. The succeeding eight bits are fixed to "0." Eight-bit Amin, Asec and Aframe are absolute time codes in one disk, and represent minutes, seconds, and frame sequence, respectively. Also, "0" is the innermost circumference of the disk, that is, where the programs start.

Figure 3A:
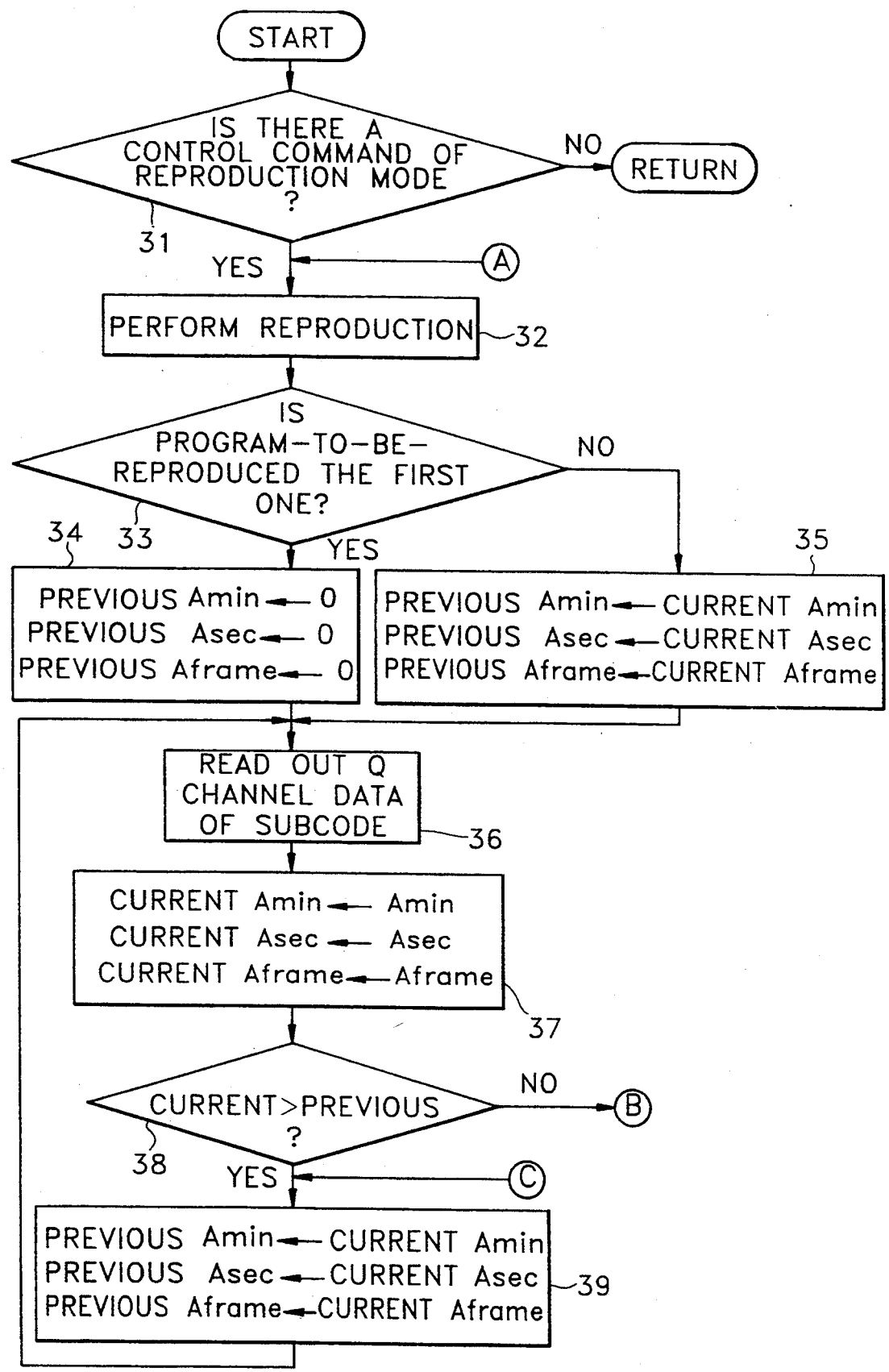
FIGS. 3A and 3B show a flowchart detailing the operation according to the present invention.
Figure 3B:
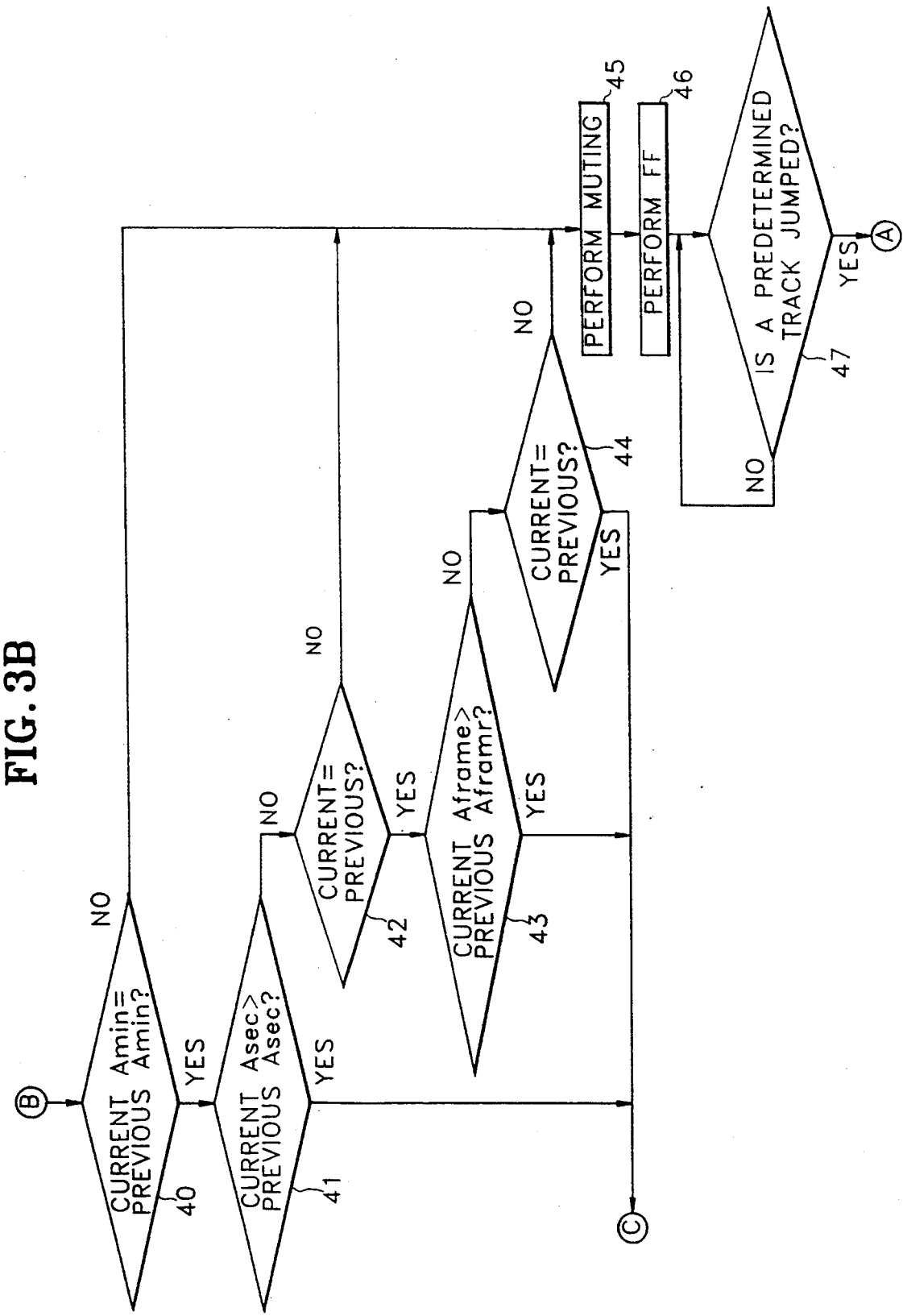

FIGS. 3A and 3B detail a flowchart showing the operation for reproducing an optical disk according to the present invention.

Here, steps 31 through 35 are initializing operations, wherein the previous Amin, previous Asec and previous Aframe values are initialized. Steps 36 and 37 are for setting the current Amin, current Asec and current Aframe values by reading out the data of channel Q in the subcode in the current pickup position. Steps 38 and 40 through 44 are for checking the increase of time by comparing each previous Amin, Asec and Aframe with the respective current Amin, Asec and Aframe. A step 39 is for updating each current Amin, Asec and Aframe to the previous Amin, Asec and Aframe. Steps 45 through 47 are for a muting processing and a jumping operation as far as a predetermined track.

Hereinbelow, the operation of FIGS. 3A and 3B will be described with reference to FIGS. 1 and 2A through 2C.

Upon applying a control command of a reproduction mode, reproduction is executed. When there is no control command, the program returns (steps 31 and 32). It is then determined whether or not a program to be reproduced is the first one (step 33). If the program is the first one, each previous Amin, Asec and Aframe is initialized to "zero" (step 34). When the program is not the first one, i.e., when reproducing a subsequent program selection, each current Amin, Asec and Aframe is initialized to each previous Amin, Asec and Aframe (step 35).

Upon completing the initialization, the music (or data recorded on the disk) is actually reproduced. Here, system-control processor 15 reads out Q-channel data of the subcode recorded on the disk 10 via pickup 11 (step 36). The read out absolute time code information is termed as Amin, Asec and Aframe, respectively. In the read-out Q-channel data region, the Amin, Asec and Aframe are respectively set as the current Amin, Asec and Aframe (step 37).

Then, a succeeding step is performed for comparing previous time information with current time information, wherein the absolute time value is compared first. When the current Amin is larger than the previous Amin, it is determined that there is no occurrence of the optical pickup restraint phenomenon, so that step 39 is carried out (step 38). When the current Amin is not greater than the previous Amin, it is determined whether the current Amin equals the previous Amin (step 40). If the current Amin is the same as the previous Amin, step 41 is executed. Otherwise, it is determined that the optical pickup restraint phenomenon has occurred. For example, when the previous time information reads 5 min.-00 sec.-00 frame, and the current time information reads 4 min.-59 sec.-70 frame, further reproduction is not being performed and tracking is being backwardly carried out, which means the occurrence of the optical pickup restraint.

If it is determined that the optical pickup restraint phenomenon occurs, system-control processor 15 mutes an audio output (step 45). Then, while performing a fast-forward (FF) operation, a track jumping operation is performed so that the pickup jumps to a predetermined track (e.g., the next track) to thereby escape from the track where the optical pickup restraint phenomenon has occurred (steps 46 and 47). Once escaped from the present track, the normal reproduction continues.

If the previous Amin equals the current Amin in step 40, the absolute seconds are compared. When the current Asec is greater than the previous Asec, step 39 is executed (step 41). If the current Asec is not greater than the previous Asec, it is determined whether or not the current Asec is the same as the previous Asec (step 42). When the current Asec is the same as the previous Asec, step 43 is performed. Otherwise, the above-described steps 45 through 47 are executed. For example, when the previous time information is 5 min.-30 sec.-00 frame, and the current time information is 5 min.-29 sec.-70 frame, the current Asec is smaller than the previous Asec, meaning that the optical pickup restraint phenomenon has occurred.

Next, the current Aframe is compared with the previous Aframe in step 43. If the current Aframe is greater than or equal to the previous Aframe, step 39 is carried out. Meanwhile, if the current Aframe is smaller than the previous Aframe, steps 45 through 47 are carried out (steps 43 and 44). For example, when the previous time information is 5 min.-30 sec.-70 frame, and the current time information is 5 min.-30 sec.-65 frame, the current Aframe is smaller than the previous Aframe, which means occurrence of the optical pickup restraint.

According to the present invention as described above, time information in the Q-channel data area of the subcode recorded on a disk is read out, so that an increase of time is checked to thereby prevent the optical pickup restraint phenomenon due to, for example, a scratch on the disk.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A method for reproducing an optical disk, comprising the steps of:
    checking whether there has been an increase of time by comparing current time information with previous time information in the order of absolute minutes, absolute seconds and absolute frames, during a normal reproduction mode of operation; and
    causing said optical pickup to execute a relative forward jump from its present track when it is determined in said checking step that there has not been an increase in time.

2. A method for reproducing an optical disk as claimed in claim 1, wherein respective time information is absolute time with respect to all programs of said optical disk.

3. A method for reproducing an optical disk as claimed in claim 1, wherein said jumping of said optical pickup is carried out by performing a fast forward operation.

4. A method for reproducing an optical disk as claimed in claim 1, further comprising the step of muting a reproduction output, said muting step being performed when it is determined in said checking step that there has not been said increase in time.

5. A method for reproducing an optical disk as claimed in claim 1, wherein respective time information is recorded on a Q-channel of a subcode recorded on the disk.

6. An optical disk reproducing device including an optical pickup for reproducing an optical disk, comprising:

checking means for checking whether there has been an increase of time in accordance with time information recorded on the disk; and means for causing the optical pickup to jump from its present track to a predetermined different track, wherein said jump is performed in a forward direction relative to a normal reproduction mode, when said checking means determines that there has not been an increase in time.

7. The device as defined in claim 6, whether said checking means includes comparator means for comparing present reproduced time information with previous reproduced time information.

8. The device as defined in claim 6, further comprising muting means for muting a reproduction output when said checking means determines that there has not been an increase in time.

9. The device as defined in claim 6, wherein the time information is recorded on a Q-channel of a subcode recorded on the disk.

10. A method for reproducing an optical disk, said method comprising the steps of:

reproducing information from the disk at a speed corresponding to a normal reproduction mode of operation;

checking whether there has been an increase of time by comparing current time information with previous time information in the order of absolute minutes, absolute seconds and absolute frames, during a normal reproduction mode of operation.

11. A method for reproducing an optical disk as claimed in claim 10, wherein respective time information is absolute time with respect to all programs of said optical disk.

12. A method for reproducing an optical disk as claimed in claim 10, wherein said jumping of said optical pickup is carried out by performing a fast forward operation.

13. A method for reproducing an optical disk as claimed in claim 10, further comprising the step of muting a reproduction output, said muting step being performed when it is determined in said checking step that there has not been an increase in time.

14. A method for reproducing an optical disk as claimed in claim 10, wherein respective time information is recorded on a Q-channel of a subcode recorded on the disk.

* * * * *